(12) United States Patent
Shiau et al.

(10) Patent No.: US 8,298,455 B2
(45) Date of Patent: Oct. 30, 2012

(54) ALIGNMENT MATERIAL COMPOSITION AND ALIGNMENT LAYER

(75) Inventors: Yi-Hau Shiau, Taichung County (TW);
Suo-Chun Hsu, Taoyuan County (TW);
Hsin-An Cheng, Hsinchu County (TW);
Yang-Chu Lin, Hsinchu (TW);
Liang-Ying Huang, Hsinchu (TW);
Tai-Hsiang Huang, Taipei County (TW)

(73) Assignee: Au Optronics Corporation, Hsinchu (TW)

( * ) Notice: Subject to any disclaimer, the term of this patent is extended or adjusted under 35 U.S.C. 154(b) by 265 days.

(21) Appl. No.: 12/468,071

(22) Filed: May 19, 2009

(65) Prior Publication Data

US 2010/0213423 A1 Aug. 26, 2010

(30) Foreign Application Priority Data

Feb. 26, 2009 (TW) .............................. 98106178 A (51) Int. Cl.
*F21V 9/04* (2006.01)
*F21V 9/06* (2006.01)
*G02B 5/22* (2006.01)
*G02B 5/26* (2006.01)
*G03B 21/04* (2006.01)

(52) U.S. Cl. ........ 252/589; 252/588; 349/123; 349/187; 428/1.1; 524/100; 524/325

(58) Field of Classification Search ................ 252/589, 252/588; 524/558, 201, 236, 99, 100, 325; 428/323, 1.1; 359/265; 349/123, 187
See application file for complete search history.

(56) References Cited

U.S. PATENT DOCUMENTS

| | | | |
|---|---|---|---|
| 6,468,609 B2 | 10/2002 | Marien et al. | |
| 6,618,103 B2 | 9/2003 | Hisamitsu et al. | |
| 7,208,205 B2 | 4/2007 | Shibue et al. | |
| 2002/0161075 A1* | 10/2002 | Sassi | 524/99 |
| 2005/0090587 A1 | 4/2005 | Dunn | |
| 2005/0277729 A1* | 12/2005 | Tsunemine et al. | 524/558 |
| 2006/0268201 A1* | 11/2006 | Chang et al. | 349/106 |
| 2008/0107828 A1 | 5/2008 | Ohtani et al. | |
| 2010/0105830 A1 | 4/2010 | Kaneko | |

FOREIGN PATENT DOCUMENTS

| | | |
|---|---|---|
| CN | 1334847 | 2/2002 |
| JP | 2007297606 | 11/2007 |
| TW | 200401926 | 2/2004 |
| TW | 200422339 | 11/2004 |
| TW | 200615365 | 5/2006 |
| TW | 200732418 | 9/2007 |
| TW | 200738777 | 10/2007 |
| TW | 200906587 | 2/2009 |

OTHER PUBLICATIONS

"1st Office Action of China counterpart application", issued on Feb. 5, 2010, p. 1-p. 5.
"Office Action of Taiwan Counterpart Application", issued on Jun. 18, 2012, p. 1-p. 10, in which the listed references were cited.

* cited by examiner

*Primary Examiner* — Bijan Ahvazi
(74) *Attorney, Agent, or Firm* — Jianq Chyun IP Office (57) ABSTRACT

An alignment material composition including an alignment material, an ultraviolet absorbent, a light stabilizer and a solvent is provided. The ultraviolet absorbent has a formula 1 shown as below:

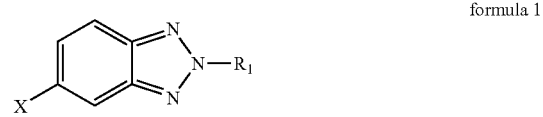

formula 1 wherein X represents hydrogen, alkyl group or halogen while R1 represents benzene ring carbon long-chain derivative. The light stabilizer has a formula 2 shown as below:

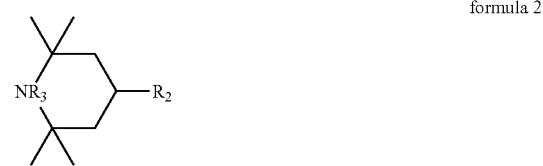

formula 2 wherein R2 represents ester-based derivative or amine-based derivative, R3 represents hydrogen, hydroxyl group (—OH) or alkyl group.

11 Claims, 2 Drawing Sheets

ALIGNMENT MATERIAL COMPOSITION AND ALIGNMENT LAYER

CROSS-REFERENCE TO RELATED APPLICATION

This application claims the priority benefit of Taiwan application serial no. 98106178, filed on Feb. 26, 2009. The entirety of the above-mentioned patent application is hereby incorporated by reference herein and made a part of specification.

BACKGROUND OF THE INVENTION

1. Field of the Invention

The present invention relates to an alignment material composition and an alignment layer, and particularly to an alignment material composition and an alignment layer which effectively absorb ultraviolet light and prevent aging of liquid crystals.

2. Description of Related Art

Recently, in order to make liquid crystal display (LCD) panels achieve power conservation and lower power consumption, the industry mostly sets driving devices at functions of lower frame frequencies and grayscale display. However, since the charged ions existing in the LCD panel have enough moving time to form an internal electrical field, the internal electrical fields makes arranging directions of liquid crystals change, thereby causing problems of display quality in the LCD panel. The problems include: voltage holding ratios (VHR), threshold voltage, flicker and image-retention effect, etc.

Reasons of forming above-mentioned charged ions often come from materials of the liquid crystals or of an alignment layer, especially when the liquid crystals or the alignment layer is irradiated by ultraviolet light. Energy of ultraviolet light causes photo-chemical reactions to occur within the liquid crystals or within the alignment layer, and the charged ions are released. Therefore, when the LCD panel is chronically irradiated by a backlight source or an external light source, the above-mentioned problems will be gradually generated, and this is conventionally known as the aging of liquid crystal.

SUMMARY OF THE INVENTION

In light of the above, the present invention provides an alignment material composition and an alignment layer that effectively absorb ultraviolet light and prevent the aging of liquid crystals.

The present invention provides an alignment material composition which includes an alignment material, an ultraviolet absorbent, a light stabilizer and a solvent. The ultraviolet absorbent has a following formula 1-1 or a formula 1-2:

formula 1-1 formula 1-2 wherein X represents hydrogen, alkyl group or halogen, and R1 represents benzene ring carbon long-chain derivative; the light stabilizer has a following formula 2:

formula 2 wherein R2 represents ester-based derivative or amine-based derivative, and R3 represents hydrogen, hydroxyl group or alkyl group.

The present invention provides an alignment layer suitable to be used in an LCD panel. Constituents of the alignment layer include the above-mentioned alignment material, the ultraviolet absorbent and the light stabilizer.

Due to the above, the alignment material composition and the alignment layer of the present invention achieves effects of effectively absorbing ultraviolet light and preventing aging of the liquid crystal through adjusting categories and composition ratios of the alignment material, the ultraviolet absorbent, the light stabilizer and the solvent.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Alignment Material Composition

An alignment material composition of the present invention includes an alignment material, an ultraviolet absorbent, a light stabilizer and a solvent. The ultraviolet absorbent has a following formula 1-1 or a formula 1-2:

formula 1-1 formula 1-2 wherein X represents hydrogen, alkyl group or halogen, and R1 represents benzene ring carbon long-chain derivative.

The light stabilizer has a following formula 2:

formula 2 wherein R2 represents ester-based derivative or amine-based derivative, and R3 represents hydrogen, hydroxyl group or alkyl group.

In detail, the above alignment material includes, for example, polyamide acid composition, but the present invention is not limited thereto. R1 of the ultraviolet absorbent represents a substituted group shown as following formula 3:

formula 3 wherein A1 represents hydrogen, alkyl group or formula 4 and A2 represents alkyl group, —CH2CH2CO(OCH2CH2)$_6$, —CH2CH2CO(OCH2CH2)$_7$, formula 5

—CH2CH2CO(OCH2CH2)$_6$OCOCH2CH2 formula 6

—CH2CH2CO(OCH2CH2)$_7$OCOCH2CH2 formula 7 formula 4

The above ultraviolet absorbent absorbs energy of ultraviolet light, and especially according to an embodiment of the present invention, the ultraviolet absorbent absorbs ultraviolet light having wavelengths distributed from 190 nm to 400 nm. When the ultraviolet absorbent absorbs ultraviolet light having wavelengths distributed from 190 nm to 400 nm, energy of visible light having wavelengths from 400 nm to 720 nm is not absorbed so that the brightness is not reduced. In other words, transmittance of visible light is not reduced when preventing aging of the liquid crystals.

For example, the above ultraviolet absorbent may be chosen from at least one of following compounds:

formula 8 formula 9 formula 10

(Phenol,2-(2H-benzotriazol-2-yl)-4,6-bis(1,1-dimethylpropyl)-)

formula 12

(2-(2H-benzotriazol-2-yl)-4-methyl-Phenol 2-(2'-Hydroxy-5'-methyl phenyl)benzotriazole)

formula 13

(2-(2H-benzotriazol-2-yl)-4-(1,1,3,3-tetramethylbutyl)-Phenol)

formula 14 formula 11

(2-Propenoic acid, 2-methyl-,2-[3-(2H-benzotriazol-2-yl)-4-hydroxyphenyl]ethyl ester)

formula 15

(Phenol, 2-(2H-benzotriazol-2-yl)-4-(1,1-dimethylethyl)-)

formula 16

(Phenol, 2-(2H-benzotriazol-2-yl)-4-(1,1-dimethylethyl)-6-(1-methylpropyl)-)

formula 17

(2-(5-Chloro-2H-benzotriazol-2-yl)-6-(1,1-dimethylethyl)-4-methylphenol)

formula 18

(2-(2H-Benzotriazol-2-yl)-4,6-bis(1-methyl-1-phenylethyl)phenol)

formula 19 formula 20

The above ultraviolet absorbent has a chromophore group which absorbs ultraviolet light having wavelengths from 190 nm to 400 nm in the alignment material composition, the chromophore is, for example:

—N═N—;
>C═N—;
C—O; and
—N═O.

Hence, the ultraviolet absorbent forms hydrogen bonds after absorbing energy of ultraviolet light, and reversible reactions of tautomerism between molecules occur to convert light energy into heat. The ultraviolet absorbent returns to an original ground state after depleting absorbed energy as heat.

In the alignment material composition provided by the present invention, the above light stabilizer may be chosen from at least one of following compounds:

formula 21 formula 22 formula 23 formula 24 formula 25 formula 26 n = 1~10 formula 27 formula 28 n = 1~5

A functioning mechanism of the above light stabilizer is that the nitrogen atoms on a piperidine capture the peroxide radicals, so that the peroxide radical enter a reversible reaction and cannot further damage molecular bonds of the alignment material or liquid crystal material.

In addition, the above solvent may include:
N-Methyl Pyrrolidone (NMP)

formula 29

γ-Butyrolactone formula 30

Ethylene Glycol Monobutyl Ether formula 31 formula 32 n = 1 ~ 10 formula 33

It should be noted that the alignment material composition provided by the present invention has a characteristic of simultaneously adding the ultraviolet absorbent and the light stabilizer into the alignment material. In addition to protecting the alignment material, the ultraviolet absorbent also protects the light stabilizer from being damaged by ultraviolet light, thereby retaining original stabilizing effects thereof. Hence, a synergistic effect on the aim of preventing aging of the liquid crystal is achieved.

Although the above ultraviolet absorbent and the light stabilizer both have functions of protecting the liquid crystal, functions thereof are affected by a plurality of factors, for example: solubility, dispersibility, volatility and molecular structure, and the like. In addition, formability into a film when subsequently forming the alignment layer needs to be taken into consideration in formation of the above alignment material composition.

Considering each of the above factors, according to a preferred embodiment of the present invention, in the above alignment material composition, a content of the alignment material is 2 to 7 wt %, a content of the ultraviolet absorbent is 0.2 to 2.0 wt %, and a content of the light stabilizer is 0.2 to 2.0 wt %. The alignment material composition having the above ranges obtains more obvious effects of absorbing ultraviolet light and preventing the aging of the liquid crystals.

Alignment Layer

Figure 1:
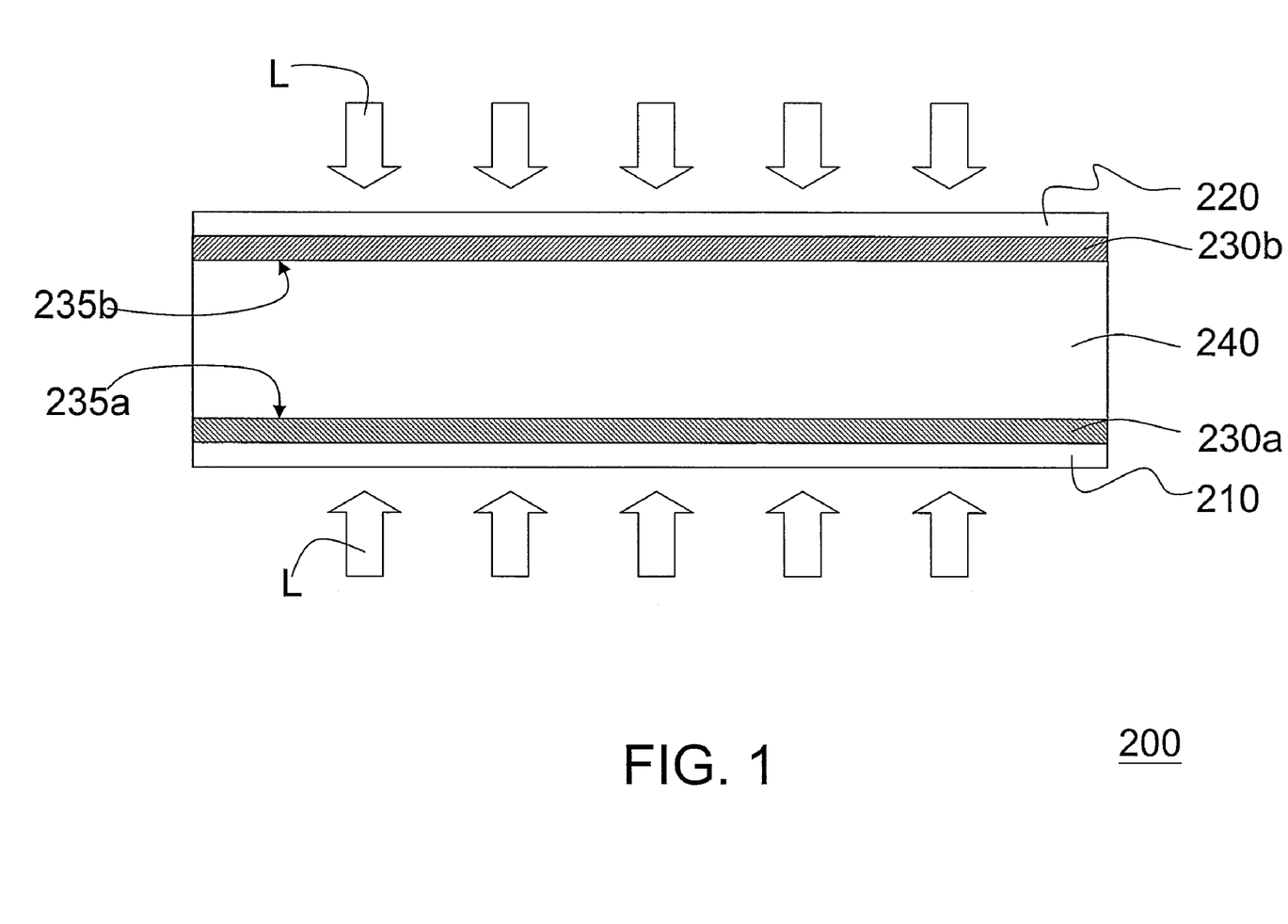
FIG. 1 is a schematic view of an LCD panel.

FIG. 1 is a schematic view of an LCD panel. Referring to FIG. 1, the present invention provides alignment layers 230*a* and 230*b* which are suitable to be used in an LCD panel 200. Constituents of the alignment layers 230*a* and 230*b* include the alignment material, the ultraviolet absorbent and the light stabilizer. The formulas of the alignment material, the ultraviolet absorbent and the light stabilizer have already been illustrated in the above embodiments and are not repeatedly illustrated here.

In the LCD panel 200, the alignment layers 230*a* and 230*b* are respectively disposed on two substrates 210 and 220. The substrates 210 and 220 are, for example, a thin film transistor array substrate and a color filter substrate, and a liquid crystal layer 240 is disposed between the two alignment layers 230*a* and 230*b*. Constituents of the alignment layers 230*a* and 230*b* are substantially the same as the constituents of the alignment material composition according to the above embodiments. A main difference is that in the constituents of the alignment layers 230*a* and 230*b*, the solvent has been removed. In practice, when producing the alignment layers 230*a* and 230*b*, a pre-baking (at 120 degrees centigrade, 2 minutes) and a hard-baking (220 degrees centigrade, 15 minutes) processes may be performed on the above alignment material composition. Said process removes the solvent to obtain the alignment layers 230*a* and 230*b*.

Since the alignment layers 230*a* and 230*b* provided by the present invention have a synergistic effect by the ultraviolet absorbent and the light stabilizer, there is a more significant effect of absorbing ultraviolet light, and the aging of the liquid crystal layer 240 caused by ultraviolet light when the LCD panel 200 is irradiated by a light L is effectively prevented.

Voltage Holding Ratio

It should be noted that, in order to quantitatively analyze the phenomenon of the aging of the liquid crystals, measurement of voltage holding ratios are generally performed. To the above LCD panel 200, the voltage holding ratio is an important parameter. The higher the voltage holding ratio, the more aligned on a specific direction liquid crystal molecules (not shown) in the liquid crystal layer 240 are maintained, meaning that the LCD panel has a better display uniformity. However, when the LCD panel is used under a lower driving frequency, the charged ions (not shown) in the LCD panel 200 would have enough time to drift to the interfaces 235a and 235b that are between the alignment layers 230a and 230b and the liquid crystal layer 240, so that the voltage holding ratio of the liquid crystal layer 240 decreases. Hence, measuring the voltage holding ratios under different driving frequencies may be designed, and degrees of aging are known by comparing the results of measurement.

The following uses the voltage holding ratios of two embodiments to illustrate the present invention.

Control Embodiment

According to the control embodiment of the present invention, a material of the alignment layers is 100 grams of polyamide acid compounds. Especially, no ultraviolet absorbents or light stabilizers is added in the alignment layer. Testing of the voltage holding ratios is performed on a sample produced according to said composition under different driving frequencies and voltages, and a result is shown as S1 in FIG. 2. A testing condition A is a 60 hertz driving frequency and a 1 volt voltage; a testing condition B is a 0.6 hertz driving frequency and a 1 volt voltage; a testing condition C is a 60 hertz driving frequency and a 5 volt voltage; a testing condition D is a 0.6 hertz driving frequency and a 5 volt voltage. In addition, in the above four testing conditions, a scanning time of a frame is 60 microseconds.

Next, ultraviolet irradiation is performed on the sample according to the present embodiment. After irradiating using energy of 50 mW per second for 30 seconds, testing of the voltage holding ratios is performed on the sample irradiated by ultraviolet light in the same measure according to the above four testing conditions A, B, C and D. A result thereof is shown as S2 in FIG. 2.

Figure 2:
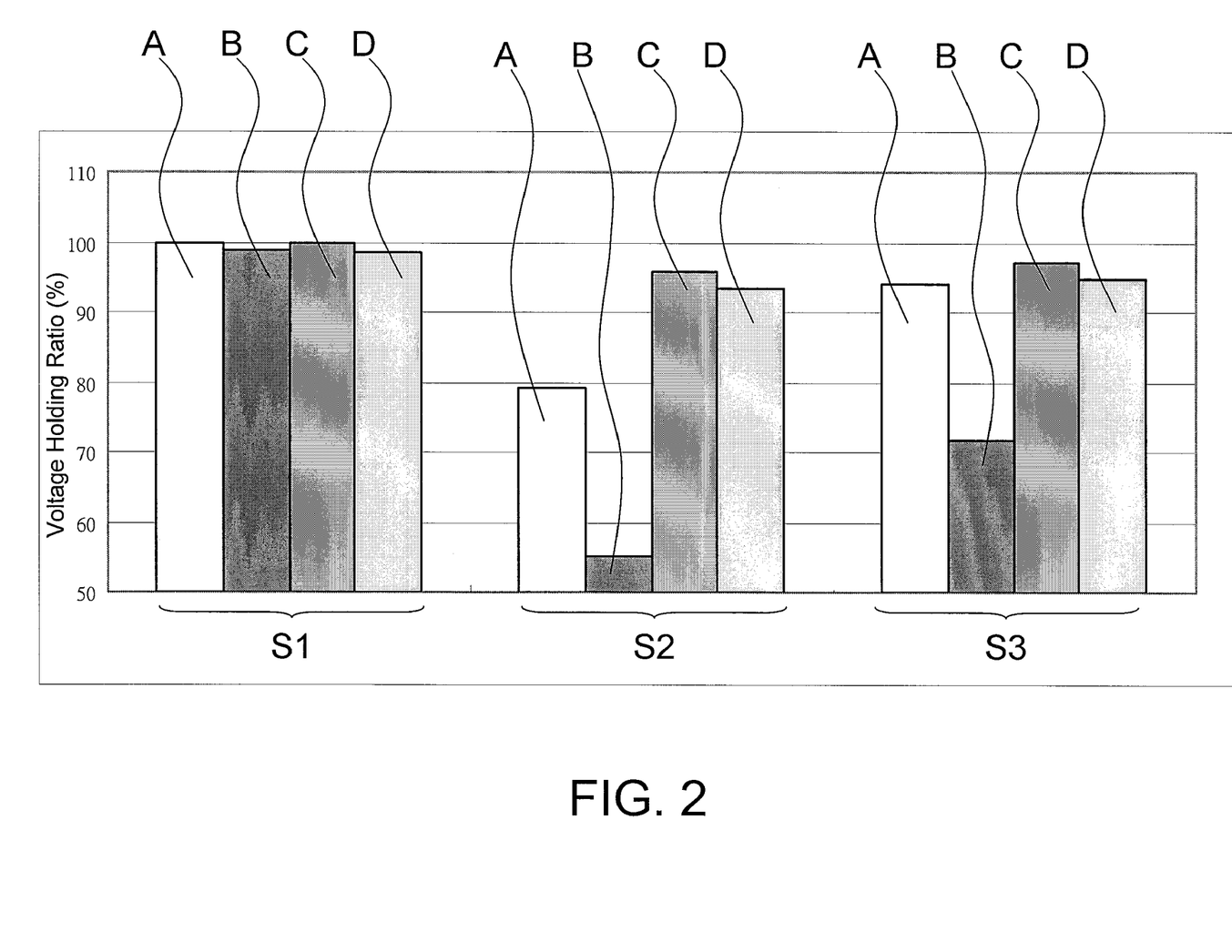
FIG. 2 is a bar graph of voltage holding ratios under different testing conditions according to different embodiments.

Referring to FIG. 2, after being irradiated by ultraviolet light, the voltage holding ratios of the sample according to the present embodiment are all lower than that before being irradiated by ultraviolet light. Under testing conditions A and B, the voltage holding ratios are both lower than 80%. Especially, the voltage holding ratio of the testing condition B is even lower than 60%.

Most Preferred Embodiment

According to the most preferred embodiment of the present invention, the weight of the material of the alignment layers is 99.6 grams, and the alignment material includes polyamide acid composition and the solvent. The ultraviolet absorbent is 0.2 gram of (Phenol,2-(2H-benzotriazol-2-yl)-4,6-bis(1,1-dimethylpropyl)-).

formula 10

The light stabilizer is 0.2 gram, and the light stabilizer includes following two compounds:

formula 21 formula 22

According to the present embodiment, after a drying process, a weight ratio of remaining solid content of the alignment material, the ultraviolet absorbent and the light stabilizer of the alignment layers 230a and 230b is approximately 30:1:1.

Ultraviolet irradiation is performed on a sample produced according to the above ratio. After irradiating with ultraviolet light having energy of 50 mW per second for 30 seconds, measurement of the voltage holding ratios is similarly performed according to the above four testing conditions A, B, C and D. A result thereof is shown as S3 in FIG. 2.

Referring to FIG. 2, relative to the results according to the control embodiment, even under the strictest testing condition B (low driving frequency and low voltage), the voltage holding ratio according to the present embodiment is still maintained above 70%, and is even maintained above 94% under the other testing conditions A, C and D. In addition, if only the ultraviolet absorbent is added in the alignment material which is polyamide acid composition, the voltage holding ratio under the testing condition B is approximately 62%. If only the light stabilizer is added in the alignment material which is polyamide acid composition, the voltage holding ratio under the testing condition B is approximately 56% Hence, according to the present embodiment, the voltage holding ratios of the alignment layer having both the above ultraviolet absorbent and the light stabilizer are above 70%. The voltage holding ratios are significantly enhanced compared with 62% when only the ultraviolet absorbent is added or 56% when only the light stabilizer is added.

In summary, since the ultraviolet absorbent and the light stabilizer are both added into the alignment material of the alignment material composition and the alignment layer of the present invention, the present invention effectively prevents aging of the liquid crystals, maintains uniformity and display effects, and increases a lifespan of the LCD panel.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An alignment material composition, comprising:
an alignment material;
an ultraviolet absorbent, wherein the ultraviolet absorbent comprises a following formula

1-1 or a following formula 1-2:

formula 1-1 formula 1-2 wherein X represents hydrogen, alkyl group or halogen, and $R_1$ represents benzene ring carbon long-chain derivative;

a light stabilizer is selected from at least one of following compounds:

formula 27 formula 28 n=1-5 and a solvent,
wherein the alignment material comprises polyamide acid composition, and wherein a content of the alignment material is 2 to 7 wt %, a content of the ultraviolet absorbent is 0.2 to 2.0 wt %, and a content of the light stabilizer is 0.2 to 2.0 wt %.

2. The alignment material composition of claim 1, wherein absorption wavelengths of the ultraviolet absorbent are wavelengths of ultraviolet light from 190 nm to 400 nm.

3. The alignment material composition of claim 1, wherein the R1 of the ultraviolet absorbent represents a substituted group shown as a following formula 3:

formula 3 wherein A1 represents hydrogen, alkyl group or formula 4 and
A2 represents alkyl group, —CH2CH2CO(OCH2CH2)$_6$,—CH2CH2CO(OCHH2)$_7$, formula 5

—CH2CH2CO(OCH2CH2)$_6$OCOCH2CH2 formula 6

—CH2CH2CO(OCH2CH2)$_7$OCOCH2CH2 formula 7 or formula 4

4. The alignment material composition of claim 3, wherein the ultraviolet absorbent is selected from at least one of following compounds:

formula 8 formula 9 formula 10 formula 11 formula 12 formula 13 formula 14 formula 15 formula 16 formula 17 formula 18 formula 19

-continued formula 20

5. The alignment material composition of claim 1, wherein the light stabilizer further comprises at least one of following compounds:

formula 21 formula 22 formula 23 formula 24 formula 25 formula 26 formula 27

$$R-\overset{H}{N}-(CH_2)_3-\overset{R}{N}-(CH_2)_2-\overset{R}{N}-(CH_2)_3-\overset{H}{N}-R$$

6. The alignment material composition of claim 1, wherein the solvent comprises:

formula 29 formula 30 formula 31 formula 32

-continued formula 33

7. An alignment layer, suitable for being used in a liquid crystal display panel comprising a liquid crystal layer, constituents of the alignment layer comprising an alignment material, an ultraviolet absorbent and a light stabilizer, wherein the ultraviolet absorbent comprises a following formula 1-1 or a following formula 1-2:

formula 1-1 formula 1-2 wherein X represents hydrogen, alkyl group or halogen, and $R_1$ represents benzene ring carbon long-chain derivative;

the light stabilizer is selected from at least one of following compounds:

formula 27

-continued formula 28 n=1-5 wherein the alignment material comprises polyamide acid composition, and a weight ratio of the alignment material to the ultraviolet absorbent to the light stabilizer is 2-7:0.2-2.0:0.2-2.0, and wherein the alignment layer contacts with the liquid crystal layer so as to align the liquid crystal layer.

8. The alignment layer of claim 7, wherein absorption wavelengths of the ultraviolet absorbent are wavelengths of ultraviolet light from 190 nm to 400 nm.

9. The alignment layer of claim 7, wherein the R1 of the ultraviolet absorbent represents a substituted group shown as a following formula 3:

formula 3 wherein A1 represents hydrogen, alkyl group or formula 4 and
A2 represents alkyl group, —CH2CH2CO(OCH2CH2)$_6$, —CH2CH2CO(OCH2CH2)$_7$, formula 5

—CH2CH2CO(OCH2CH2)$_6$OCOCH2CH2 formula 6 formula 7 formula 4

10. The alignment layer of claim 9, wherein the ultraviolet absorbent is selected from at least one of following compounds:

formula 8 formula 9 formula 10 formula 11 formula 12 formula 13 formula 14 formula 15 formula 16 formula 17 formula 19 formula 18 formula 20

11. The alignment layer of claim 7, wherein the light stabilizer further comprises at least one of following compounds:

formula 21 formula 22 formula 23 formula 24 formula 25 formula 26 n = 1~10 formula 27

* * * * *